May 9, 1933. S. BERGSTEIN Re. 18,823

MEANS AND METHOD FOR MAKING PAPER BOXES OR THE LIKE

Original Filed May 31, 1928 4 Sheets-Sheet 1

INVENTOR.
Samuel Bergstein
BY
Allen Allen
ATTORNEYS.

MEANS AND METHOD FOR MAKING PAPER BOXES OR THE LIKE

Original Filed May 31, 1928 4 Sheets-Sheet 2

INVENTOR.
Samuel Bergstein
BY
Allen & Allen
ATTORNEYS.

MEANS AND METHOD FOR MAKING PAPER BOXES OR THE LIKE

Original Filed May 31, 1928 4 Sheets-Sheet 3

INVENTOR.
Samuel Bergstein
BY
Allen Allen
ATTORNEYS.

May 9, 1933. S. BERGSTEIN Re. 18,823

MEANS AND METHOD FOR MAKING PAPER BOXES OR THE LIKE

Original Filed May 31, 1928 4 Sheets-Sheet 4

INVENTOR.
Samuel Bergstein
BY
Allen Allen
ATTORNEYS.

Reissued May 9, 1933 Re. 18,823

UNITED STATES PATENT OFFICE

SAMUEL BERGSTEIN, OF CINCINNATI, OHIO, ASSIGNOR TO THE INTERSTATE FOLDING BOX COMPANY, OF MIDDLETOWN, OHIO

MEANS AND METHOD FOR MAKING PAPER BOXES OR THE LIKE

Original No. 1,747,887, dated February 18, 1930, Serial No. 282,020, filed May 31, 1928. Application for reissue filed November 21, 1931. Serial No. 576,590.

This invention relates to improvements in means and method for making paper containers, consisting in a machine and a method of production coordinated therewith for joining transparent material to paper material preliminary to forming the containers, having particular reference to paper containers which are provided with openings or windows covered with the transparent material.

In the art to which the invention relates machines for manufacturing paper articles of this character are generally limited to low output due to the nature of the transparent material which does not lend itself readily to rapid production on automatic machines. The invention herein set forth is an improvement of the art in this respect in the provision of an automatic machine and process of manufacturing adapted for large output; also there is improvement in the quality of the manufactured article.

An object attained in the invention consists in the provision of means for moving both the paper material and the transparent material without pause into superposed relation one with the other, the transparent material being drawn from a supply roll and severed into required lengths before the juncture is made with the paper, provision being made for supporting the web of transparent material, between the supply roll and the point where the materials are joined together, to prevent curling of the edges or crinkling of the face surfaces, which is characteristic of transparent material commonly used in the manufacture of articles of this character. This provision in the invention results in delivering the transparent material to the paper perfectly flat with the edges of the severed pieces in register and in full contact with the corresponding edges of the openings in the paper.

Figure 1:
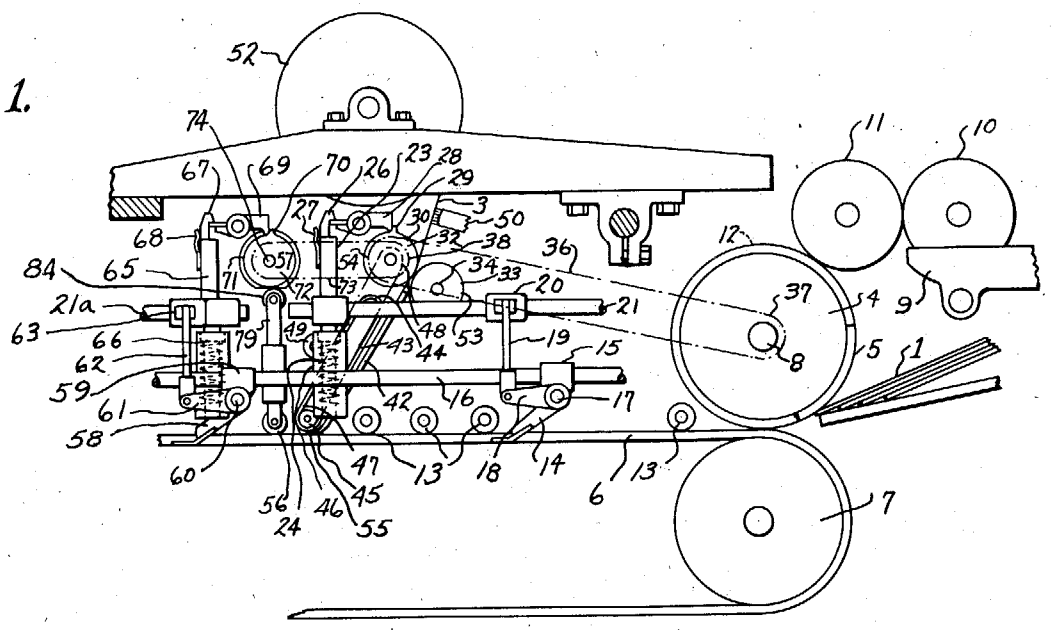
Figure 1 is a detail view in side elevation of the machine for assembling the two materials.
Figure 3:
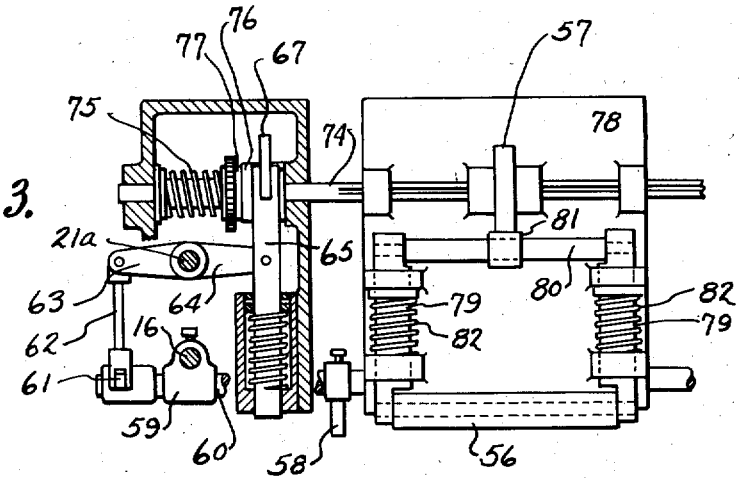
Figures 2 and 3 are detail views of parts of the mechanism shown in Figure 1.
Figure 2:
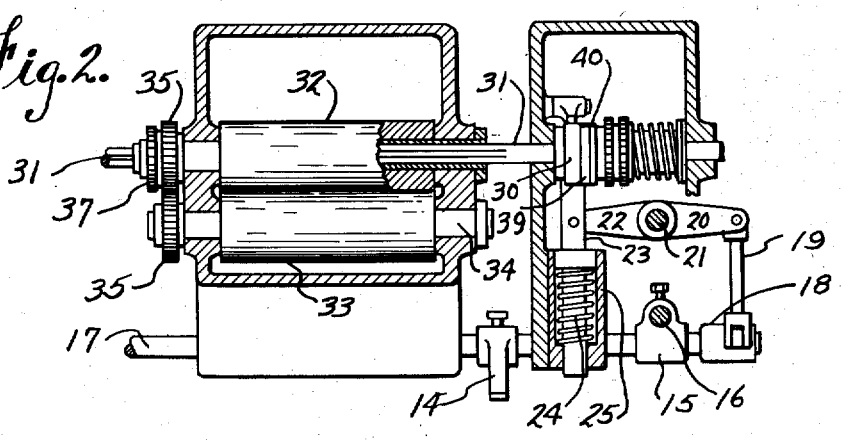
Figure 4:
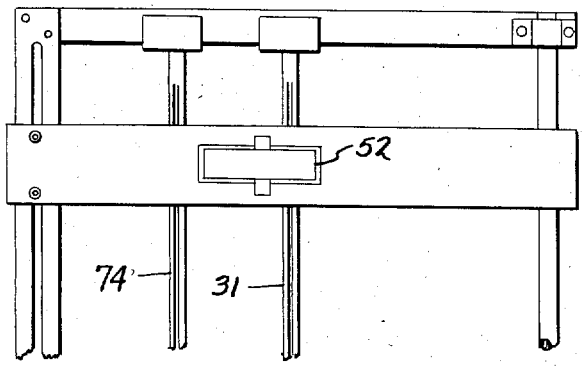
Figure 4 is a detail plan view of part of the frame structure of the machine.

The means employed for practicing the invention as herein shown and described consist in an attachment applied to a common type of machine for forming paper boxes or cartons. The construction and operation of such machines being well known in the art, only such parts of the mechanism that are directly associated with the improvements herein set forth are shown in the drawings.

Figure 5:
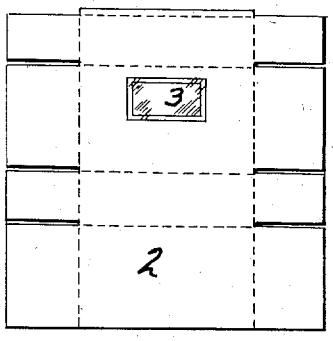
Figure 5 is a view of one form of blank of the paper material.

The box material, may be supplied to the machine in sheets of suitable size or in box blanks as illustrated in Figure 5, cut and scored for assembling; also the box material may be prepared in advance with adhesive for assembling with the transparent material and for forming and sealing the boxes, or the adhesive may be applied to the box material on the machine in any suitable manner, as illustrated in Figure 1. For stock prepared in advance with adhesive means are provided on the machine for moistening the adhesive, and for stock not prepared with adhesive, means are provided for applying adhesive to the box material before the two materials are brought together.

In Figure 1 the box material 1 is shown as arranged for feeding the blanks singly to the machine. The transparent material 3, as here shown, is wound in a roll in a continuous sheet or web, the portions required for each box blank being severed from the web incidental to assembling of one material with the other.

The feeding mechanism for the box blanks, illustrated in Figure 1, is of well known construction and is shown more or less conventionally. The parts shown consist of a feed roll 4 mounted on a shaft 8 and provided with a friction pad 5 which acts to engage the outer box blank on stack 1 and to move the same between the roller and a belt 6 which traverses a pulley 7 opposite roll 4.

Any suitable devices may be arranged for rendering the box material adhesive, accordingly as the paper stock is or is not prepared with adhesive. Such devices are well known in the art and do not require a detail showing in their relation to the improvements herein set forth, a suitable arrangement being illustrated conventionally in Figure 1 in its relation to the feed roller 4. The essential parts of the device consist in a container 9 for water, or an adhesive, as the case may be, and rollers 10—11 for conducting the liquid to the box blanks preliminary to assembling the two materials.

As the paper blanks pass from the feed roller 4 the same are held frictionally in engagement with belt 6 by a series of pressure rolls 13, the forward edge of each blank being moved into engagement with a depending arm 14 pivoted on a bracket 15, fixed on a rod 16, which is extended longitudinally of the machine. As arm 14 is actuated by the blanks the movement is transmitted through pivot shaft 17 and arm 18 secured to shaft 17, a link 19 and arm 20 to a shaft 21 which extends parallel with rod 16. From shaft 21 the movement is transmitted through arm 22 to a vertically extended, spring-tensioned bolt 23, the lower end of the bolt and spring 24, which acts to hold the bolt normally in raised position, being supported in a housing 25. The upper end of the bolt is provided with a pivoted latch or finger 26, tensioned by a spring 27, for engaging the adjacent end of a pivoted pawl 28 which coacts at its opposite end with a shoulder 29 on a disc 30 on a shaft 31 upon which an upper feed roll 32 is mounted, the roll being operably connected with a lower feed roll 33, on a shaft 34, by gears 35. The feed roll shaft 31 is connected to feed roll shaft 8 by a chain and sprocket drive 36—37—38, sprocket 38 being free rotatably and slidably on shaft 31, the driving connection between the sprocket and the shaft consisting in a friction clutch of well known construction, comprising as here shown, a disc 30 which is secured to the shaft, a fiber disc 39 which is interposed between disc 30 and a disc 40 formed integrally with sprocket 38, a spring 41 arranged telescopically of the shaft acting to exert pressure on the sprocket for effecting the friction drive.

When lever 14 is moved upward by the forward edge of a paper blank, bolt 23 is forced downward and pawl 28 is moved out of engagement with disc 30; feed rolls 32—33 are rotated through the chain and sprocket drive 36—37—38 and the friction clutch on shaft 31, pawl 28 being again in position to stop the operation of the rolls upon completion of one revolution.

The function of feed rolls 32—33 is to feed the web of transparent material 3, from a roll 52, in timed relation with the movement of the paper blanks on belt 6, the end of the portion of the web fed forward at each operation being moved into engagement with a paper blank by a second feeding mechanism consisting of an inclined guide 42 and a friction belt 43 which traverses pulleys 44—45 and coacts with guide 42 for moving the strip of material between the belt and the guide, the space between the belt and guide being determined for keeping the transparent material smooth and flat as it is delivered to the box blank. Belt 43 is driven by a chain and sprocket connection 46—47—48, an idler 49 acting to keep the chain taut. A herring bone brush 50 is lightly tensioned in any suitable manner against the web of the transparent material for smoothing the surface of the web before it passes between the feed rolls. The action of the brush together with the action of the feed rolls 32—33 and the lower end of guide 42 and belt 43 is to prevent curling and crinkling of the material so that it will be presented smooth and even over the window openings in the box blanks.

Feed rolls 32—33 are of the required diameter for feeding web 3 forward as required for presenting an end portion of the web sufficient to cover the adhesive portion of a paper blank, upon each feeding action. As the end of the web contacts with the adhesive both materials move together in superposed relation under pressure devices which act to join them firmly together.

Partial severing of the web of transparent material is effected by perforators 53—54 on feed rolls 32—33, complete severing taking place intermediate the ends of the guide 42 by tearing off the end of the web along the perforation line after the forward end has been joined to the paper blank, the diameter of feed rolls 32—33 determining the length of the strips as required. The feed rolls 32—33 are timed with feed roll 4 so that the end of the web of transparent material will be extended from the lower end of guide 42, as indicated at 55, upon arrival of each paper blank at that point. As the length of transparent material applied to each blank is determined by the diameter of the feed rollers 32—33, it will be seen that the portion so applied can be made to approximate closely in size and general outline the portion of the paper blank it is to cover, and may be varied as required by substituting rollers of different diameters.

As the forward edge of the paper blank advances beyond guide 42 it moves under pressure roll 56 which during the movement of the forward edge of the blank thereunder is in raised position. As the blank is moved along it engages an arm 58 and moves the arm upward in the same manner as the action on arm 14. Lever 58 controls the operation of a cam 57 through mechanism consisting of a bracket 59 on rod 16, shaft 60 supported in bracket 59, arm 61, link 62, arm 63, shaft 21*a*, which is axially aligned with shaft 21, arm 63, a spring-tensioned bolt 65 which comprises a spring 66, latch finger 67 tensioned by a spring 68 for actuating a pawl 69 which coacts with a shoulder 70 of a disc 71 on the same shaft as cam 57. The cam shaft is driven with a chain and sprocket connection 38*a*—72—73, sprocket 38*a* being formed integrally with sprocket 38. The driving connection between sprocket 72 and the cam shaft 74 consists of a friction clutch comprising a spring 75 for moving the sprocket axially on the shaft, a disc 76 secured to the shaft and a friction disc 77 between the sprocket and disc 76. Parts 58 to 77 inclusive are substantially the same in construction and operation as parts 14 to 39 as herein described.

When cam shaft 74 is released upon actuation of lever 58, cam 57 is actuated one turn through the connection 38*a*—72—73, operation of the cam acting to force roller 56 against the joined material 1—3, as the assembled blank is moved under the roller with the required pressure for effecting firm adhesion between the materials. The connection between the cam and the pressure roller consists of a depending frame structure 78 in which a spring-tensioned frame 79—80 is slidably supported, the upper frame member 80 being provided with a roller 81, in operable relation with cam 57, the frame 79—80 together with the pressure roller 56 being held in raised position, when the cam is in normal relation, as indicated in Figure 1, by opposite springs 82 arranged telescopically of the vertical frame members 79.

The pressure mechanism including the cam releasing arm 58 and the cam 57 are supported for lateral adjustment transversely of the machine, the cam shaft 74 being sp'ined and arm 58 provided with any suitable means as a set screw for securing the same on rod 60, for effecting the lateral adjustment. Thus the machine as a whole is readily adaptable, by shifting the position of the pressure mechanism and by interchanging feed rolls of different diameters for the transparent material, for applying the material in any required size over the window opening of the paper blank. It is apparent that the transparent material may also be cut in advance to the required size for the windows by making suitable modifications of the feeding mechanism.

Figure 6:
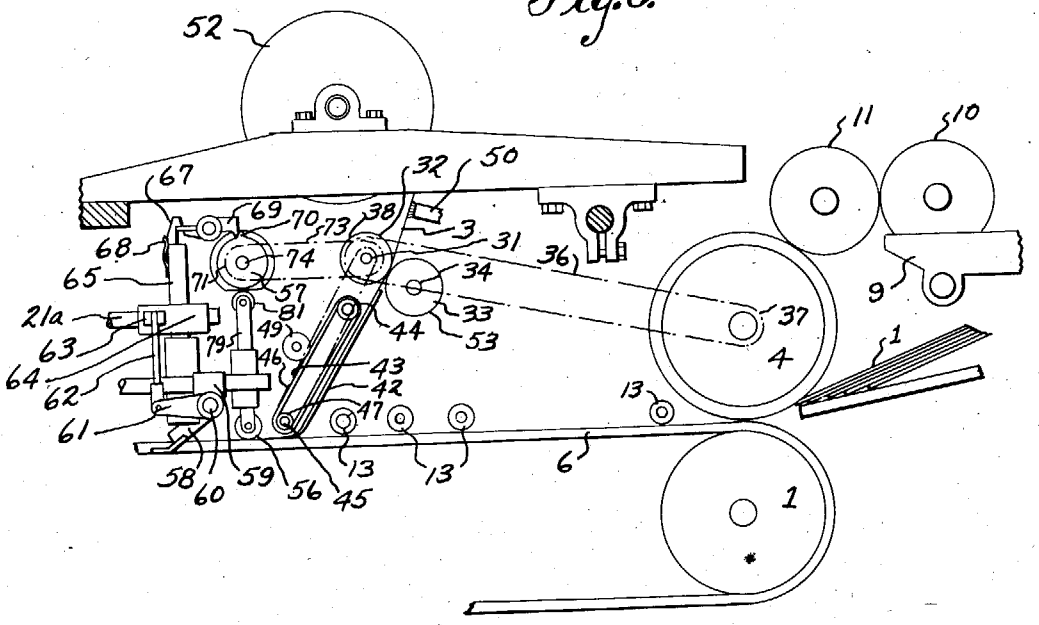
Figure 6 is a detail view in elevation of a modified construction.

A modification of the machine is shown in Figure 6 for effecting continuous feeding of the transparent material instead of intermittent feeding as herein described. The modified machine consists in the omission of the parts controlled by arm 14 for effecting intermittent operation of feed rolls 32—33, the construction and operation of the machine being otherwise the same as described. In the modified construction the feeding of the transparent material is so timed with the movement of the paper blanks that the end portion of the strip will be brought into engagement with the paper blanks and torn off on the line of perforation due to the difference of speed at which the two materials move, in the required time for effecting registration of one material with the other in the prescribed area for assembling the units.

Transparent material of the character extensively used in products of the character named is very light and tends to curl at the edges and to crinkle at free ends of the web when it is drawn off the supply roll, or on portions that are severed from the web. The means provided in the improved machine herein set forth are effective for overcoming this difficulty, the transparent material being applied over the window openings in the paper smooth and even with full contact at the edges where the adhesive joints are formed, thus resulting in an improved product.

I claim as my invention:

1. A machine for assembling sheet materials including means for rendering prescribed portions of blanks of one material adhesive, means for moving the blanks forward singly, means operably timed with the blank moving means and operably controlled by the blanks in said movement thereof for advancing a sheet of another material and disposing a portion thereof over said prescribed portion of each blank, means for effecting adhesion between said portions of the materials, and means for severing said portion of sheet material.

2. A machine for assembling sheet materials including means for rendering prescribed portions of blanks of one material adhesive, means for moving the blanks forward singly, means above the plane of movement of the blanks for advancing a sheet of another material including feed rollers and a downwardly extended guide and a friction belt coacting therewith for advancing the sheet a predetermined extent for each blank moved forward and for disposing the end portion thereof over said prescribed portion of each blank, means for effecting adhesion between said portions of the materials, and means for severing said portion of sheet material.

3. A machine for assembling sheet material including means for rendering prescribed portions of blanks of one material adhesive, means for moving the blanks forward singly, means for advancing another material and disposing a portion thereof over said prescribed portion of each blank, and pressure means rendered operative by further advancement of the blank for effecting adhesion between said materials.

4. A machine for assembling sheet materials including means for rendering prescribed portions of blanks of one material adhesive, means for moving the blanks forward singly, means for advancing another material and disposing a portion thereof over said prescribed portion of each blank, a pressure roller for effecting adhesion between said materials and a cam operably connected with the means for advancing said other material and rendered operable by further advancement of said blanks for moving the pressure roller into engagement with said materials.

5. A process for making paper boxes having transparent windows therein consisting in applying adhesive to portions of the box blanks adjacent openings therein and to other joining surfaces thereof, moving the blanks forward and feeding a continuous web of transparent material into engagement with the adhesive portions adjacent said openings of each blank for effecting adhesion of a portion of said web and blank, detaching the adhering portion of the web defined by a perforation by further movement of the blank, and forming the box incidental to said further movement thereof by effecting adhesion between said other joining surfaces.

6. A machine for joining sheet materials together adhesively, including means for moving blanks of one material progressively on said machine into the plane of movement of another material, means operable coincident with said movement of the blanks for applying adhesive to portions thereof, means operable in timed relation with the blank moving means for advancing an end portion of a web of said other material into contact with the applied adhesive, means for severing said contacting end portion of said web material, mechanical pressing means for keeping said end portion smooth and flat, and means at the junction of the planes of movement of the materials for completely joining the severed portions of the web material to the adhesive portions of said blanks.

7. A machine for joining sheet materials together adhesively, including means for moving blanks of one of said materials progressively on said machine, means operable coincident with said movement of the blanks for applying adhesive to portions thereof, means for moving a web of another material into contact with the applied adhesive on the plane of movement of said blanks, and mechanical pressing means acting to keep the web material smooth and flat in contact with both sides thereof throughout the movement of said web into said contact, means operable at the junction of the planes of movement of said materials for joining a predetermined length of the web material to the adhesive portion of each of said blanks and pressure means acting on the joined materials for effecting firm adhesion therebetween.

8. The herein described process of manufacturing paper articles, consisting in rendering a portion of the paper material adhesive, in moving the material so prepared forward, in moving a sheet of another material into engagement with the adhesive portion of the paper, in supporting said other material for a material distance along its length for keeping it smooth and flat, in partially severing the end of the advanced portion thereof and in effecting adhesion between said severed material and the paper material.

9. A machine for assembling sheet materials including means for rendering prescribed portions of one material adhesive, means for moving the material forward, means for advancing another material and disposing portions thereof over said prescribed portions of the first material, means for supporting the second material for a material distance along its length on both sides for keeping it smooth and flat, means for severing the end of the advancing second material and means for effecting adhesion between said severed material and a prescribed portion of the first material.

10. A machine for assembling sheet materials including means for rendering prescribed portions of blanks of one material adhesive, means for moving the blanks forward singly, means for advancing a web of another material and disposing a portion thereof over said prescribed portion of each blank, including means for supporting said web for a material distance along its length for keeping the material smooth and flat, means for perforating the web for determining the length of said portion, means for effecting adhesion between said portions of the materials, and means for further advancing the joined materials and acting to sever the ends of said web joined to each blank.

11. A device of the class described having means for feeding one material, means for receiving material from said feeding means and applying adhesive thereto, means for advancing the material after application of adhesive, means for feeding a second material toward and registering the same with the adhesive of the first material while being advanced by said last mentioned feeding means, and means controlled by the first material to initiate feeding operation of the feeding means for the second material only when said second material is delivered to said last mentioned feeding means.

12. A device of the class described including means for feeding one material, means for applying adhesive to a predetermined portion of the fed material, means for advancing the material after application of adhesive, means for feeding a second material toward and registering the same with the adhesive of the first, means for severing the second material, and means for holding the second material in contact with the secondary feeding means before severing operation, said advancing and secondary feeding means cooperating to press the materials together to insure adhesive juncture.

13. The process of making cartons with transparent window openings which comprises mechanically feeding an apertured carton blank of relatively heavy paper board stock, bearing an adhesive around the aperture edges, past a supply of relatively thin transparent dry sheet material having a strong tendency to curl due to its thinness and the inherent properties of the material, maintaining said sheet material in dry condition, and mechanically feeding said dry thin material directly into contact with said adhesive as the blank is fed along, by contact with both sides of said material throughout the feeding, thereby spreading said dry material smoothly across the aperture of the blank in diverse directions.

14. A machine for making cartons with transparent window openings, comprising a device for feeding endwise a web of relatively thin transparent sheet material having a strong tendency to curl due to its thinness and the inherent properties of the material, a device for feeding an apertured carton blank of relatively heavy paper board stock bearing adhesive around the aperture edges, past said sheet material feeding device, and a device operating by mechanical pressure continuously on both sides of said material, applying said sheet material directly from said feeding device to said adhesive, thereby spreading said material smoothly in diverse directions across the aperture of the blank.

15. A machine for assembling sheet materials including devices for feeding the respective materials into contact with each other, one of said materials being relatively thin and having a strong tendency to curl due to its thinness and the inherent properties of the material, and the feeding device therefor comprising elements pressing said thin material between them for a substantial distance along the material in the direction of feeding thereof, to prevent curling of the material and spread it smoothly across the other material in diverse directions, said machine also comprising means to secure the two materials together with said thin material in its smoothly spread condition.

16. A machine for assembling sheet materials including devices for feeding the respective materials into contact with each other, one of said materials being relatively thin and having a strong tendency to curl due to its thinness and the inherent properties of the material, means severing successive portions of said thin material, the feeding device for said thin material comprising elements pressing said thin material between them for a substantial distance along the material in the direction of feeding thereof, between said severing means and the place of meeting of the materials, to prevent the curling of the material and spread it smoothly across the other material in diverse directions, said machine also comprising means to secure the two materials together with said thin material in its smoothly spread condition.

17. A machine for assembling sheet materials including devices for feeding the respective materials into contact with each other, driving means operatively connected to one device and impositively operatively connected to the other device, a third device operative for pressing the assembled materials together, impositively operatively connected to said driving means, mechanisms holding the latter devices inoperative, during which their impositive connections allow slippage of the driving device relative thereto, and means associated with the latter devices, respectively, operated by material fed by the one device, for successively disengaging the respective holding means from the devices held thereby, whereupon each of said devices is driven by its impositive conection with the driving means.

18. A machine for assembling sheet materials including a device for feeding one material and a device for feeding a second material into contact with the first material, comprising elements pressing said second material between them for a material distance along the material in the direction of feeding thereof, one of said elements consisting of a moving belt and the other element extending along the path of travel of said belt, said elements counteracting curling of said second material, and said machine also including means to secure the two materials together with said second material applied to the one material in smoothly spread condition by the coaction of said elements.

19. A machine as set forth in claim 18, in which there is included means for driving the two feeding devices, and means whereby the first fed material controls the operation of the feeding device for the second material.

20. A machine as set forth in claim 18, in which there is included a device for pressing the two materials together after they are fed into contact with each other, a device whereby the first fed material controls the operation of the feeding device for the second material, and a device whereby said first fed material controls the operation of said pressing device.

SAMUEL BERGSTEIN.